J. D. LEEN.
LARD CUTTER.
APPLICATION FILED JUNE 26, 1909.

954,444.

Patented Apr. 12, 1910.

2 SHEETS—SHEET 1.

Witnesses

Inventor
John D. Leen
By
Attorney

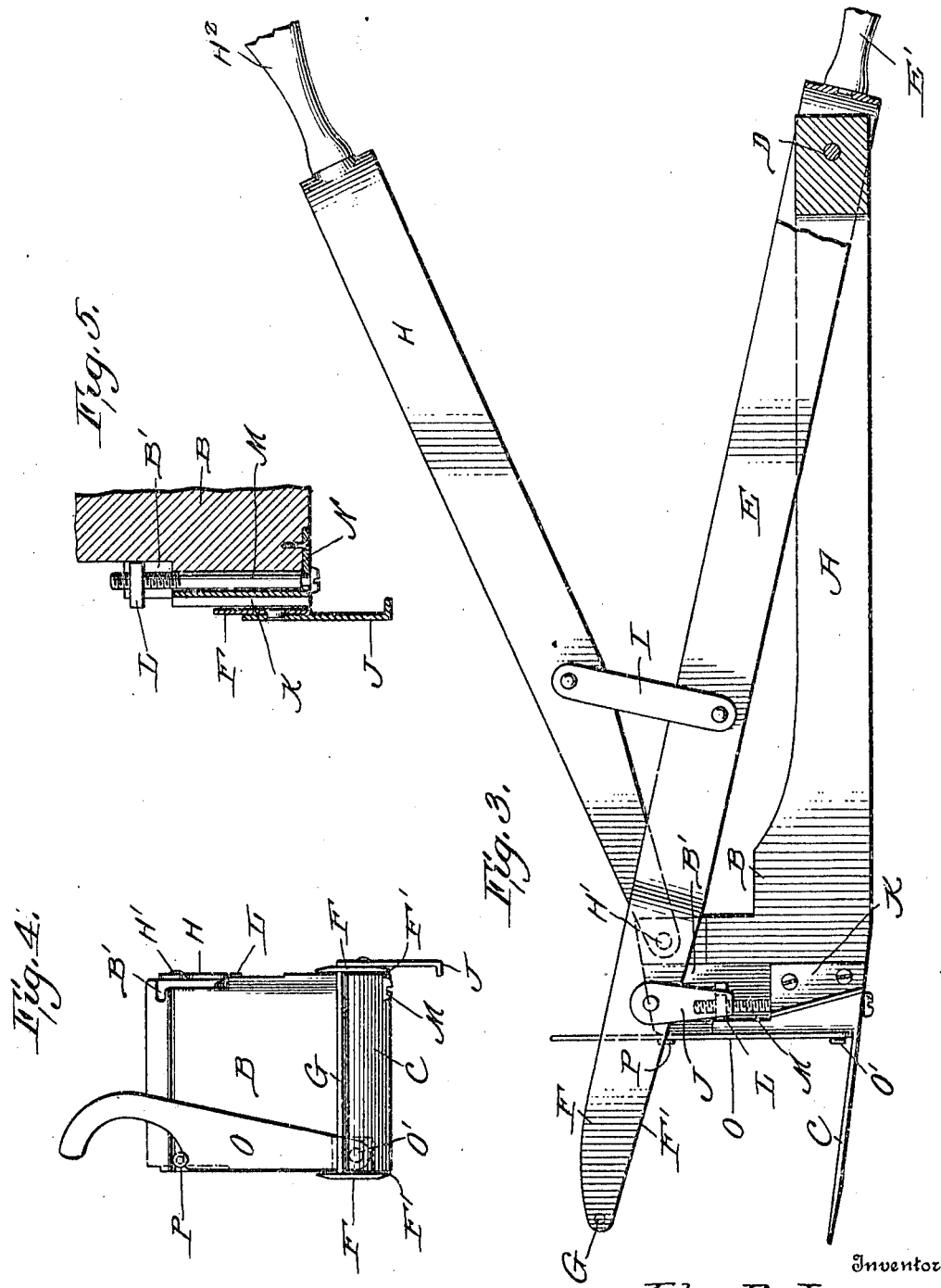

UNITED STATES PATENT OFFICE.

JOHN D. LEEN, OF BANGOR, MAINE, ASSIGNOR OF ONE-HALF TO THOMAS GALLAGHER, OF BANGOR, MAINE.

LARD-CUTTER.

954,444. Specification of Letters Patent. Patented Apr. 12, 1910.

Application filed June 26, 1909. Serial No. 504,524.

*To all whom it may concern:*

Be it known that I, JOHN D. LEEN, a citizen of the United States, residing at Bangor, in the county of Penobscot and State of Maine, have invented a new and useful Improvement in Lard-Cutters, of which the following is a specification.

This invention relates to lard cutters, the object being to provide a lard cutter by means of which an exact pound of lard can be cut from a tub or barrel.

A still further object of the invention is to provide means whereby the cutter can be adjusted so that over or under a pound of lard can be cut.

A still further object of the invention is to provide a cutter which is exceedingly simple and cheap in construction and one which can be used for cutting pounds of lard, butter or like substances from a tub whereby the pound can be delivered in a block.

A still further object of the invention is to provide means for removing the block of lard or butter from the cutter so that it can be delivered upon a tray or upon a piece of paper.

A still further object of the invention is to provide a lard cutter which is provided with a blade and a pair of cutting jaws connected together by a cross-bar, said jaws being operated by a pivoted lever.

Figure 1:
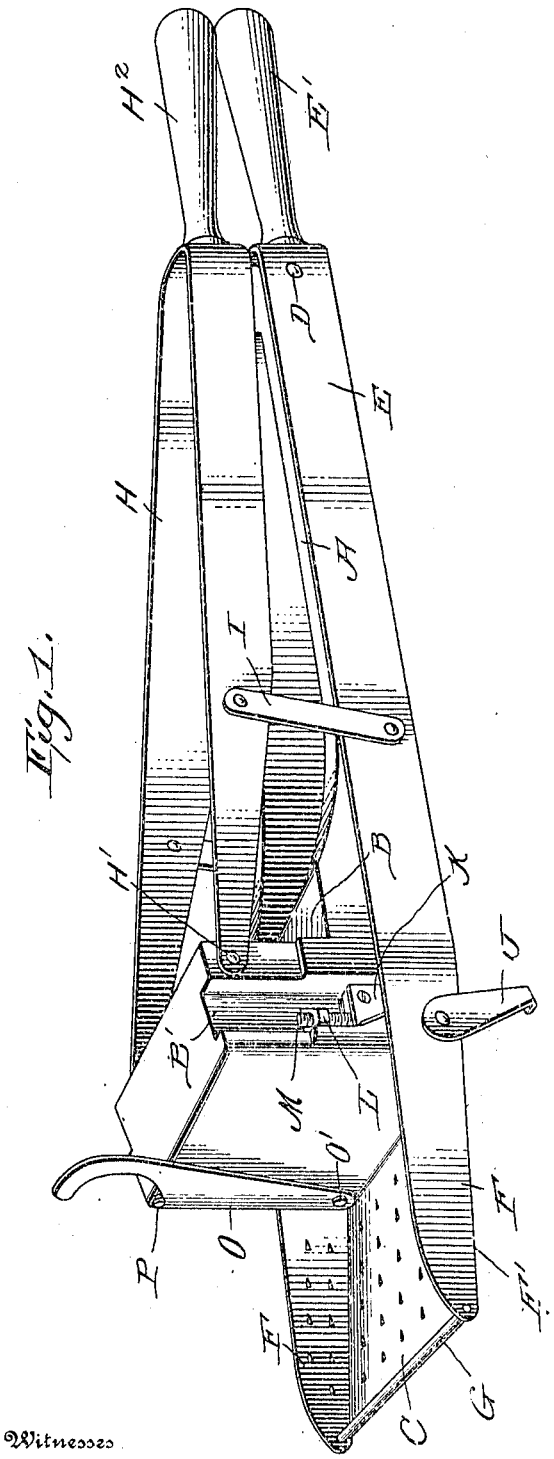
Figure 2:
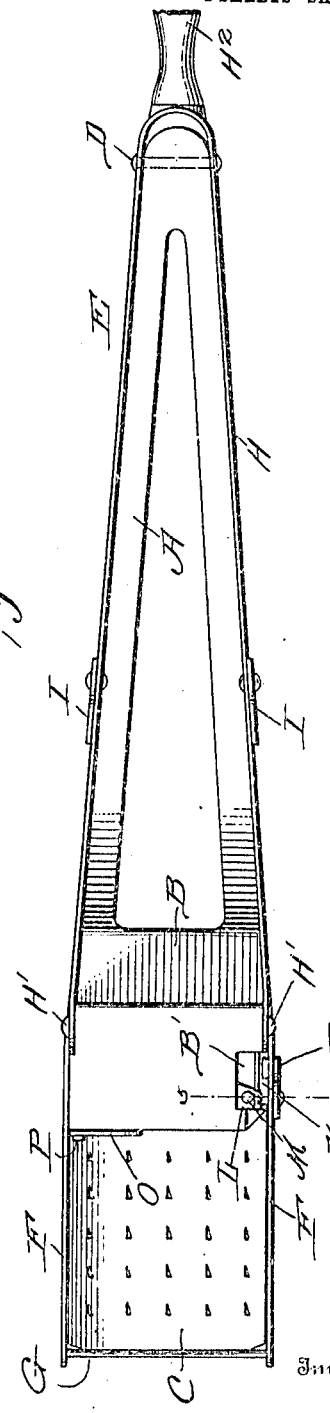

With these objects in view, my invention consists of the novel features of construction, combination and arrangement of parts hereinafter fully described, pointed out in the claims and shown in the accompanying drawings, in which, Figure 1 is a perspective view of my improved lard cutter. Fig. 2 is a top plan view of the same. Fig. 3 is a side elevation partly in section. Fig. 4 is a front view of my improved cutter and, Fig. 5 is a detail section taken on line 5—5 of Fig. 2.

In carrying out my improved invention I employ a substantially U-shaped frame A provided with an integral head B having a blade C extending therefrom which is adapted to be forced into the lard, said blade being of such a size that when forced into the lard until the head comes into engagement with the same a substantially rectangular block of lard will be cut as hereinafter fully described.

Pivotally mounted on a pin D carried by the frame A is a U-shaped shank E of a pair of jaws F which are provided with cutting edges F' adapted to co-act with the side edges of the blade C, said jaws being connected together by a cross-bar G at their ends which is adapted to be forced through the lard when the jaws are operated so as to sever the lard at the end of the blade in order that the square block can be removed.

The jaws are operated by a U-shaped lever H, the ends of which are pivotally mounted on the sides of the head as shown at H', said lever being connected to the jaws by links I and the end of the lever is provided with a handle H² and the end of the U-shaped shank E of the jaws is also provided with a handle E' which are adapted to be gripped by the hands and it will be seen that when the lever is moved upwardly the jaws will be raised so that when the blade is forced down into the lard in the tub and the lever is forced toward the handle of the shank a block of lard can be readily cut.

For regulating the upward movement of the jaws in order that the exact amount of lard can be cut that is desired I provide one of the jaws with a pivoted catch J which is adapted to travel in a guide-way K secured in a vertical groove B' formed in one side of the head B and engages a nut L carried by a screw M which is swiveled in a plate N secured to the bottom of the head and it will be seen that by operating the screw the nut can be adjusted vertically within the groove so that the upward movement of the jaws can be stopped at any desired point. By this arrangement the jaws can be adjusted so that any desired amount of lard or butter can be cut from the tub in a block thereby dispensing with the use of scales for weighing the lard or butter as I have found by experimenting that a block of lard or butter can be cut with my device which would weigh exactly one pound.

For removing the block of lard or butter from the blade C I loosely mount a pushing blade O on a pin O' on the face of the head, said head being cut away adjacent to the pin so as to allow the blade to be forced outwardly in order that the block may be pushed off of the blade C into a tray or the like. For holding the blade in such a position that it will be out of the way of the cutting blades I provide the head with an outwardly projecting pin P which is adapted to be engaged by the curved edge of a cut out portion of the pushing blade O so as to hold the same in a vertical position.

It will be seen that the pushing blade O can be operated when the blades are in a closed or opened position so as to force the block off of the blade, between the same by raising the jaws F above the head B and swinging the pushing blade O outwardly the block will drop off of the blade C.

For holding the block upon the blade between the jaws F I provide the faces of the jaws and blade with indentations so that when the same are forced into the tub of lard the lard will enter the indentations so that when the device is to be drawn from the tub a block of lard will be held in position thereon.

From the foregoing description it will be seen that I have provided a cutting device which can be used for cutting any soft substances which are packed in tubs, which will enable the store-keeper to send out such substances in blocks instead of in small particles as is the case with most store-keepers now, as in selling a pound of lard it is usually removed from the tub with a ladle so it is all guess work and the keeper is forced to add small pieces or remove small pieces of the substance after the same has been placed upon the scale to get the required amount.

With my device the keeper will be able to cut the exact amount from a tub of lard or butter in a block and it will be seen that the operation of the same is exceedingly simple, the parts being so arranged that they are not likely to get out of order in operation.

What I claim is:—

1. A cutter comprising a head provided with a blade, pivoted cutting jaws co-acting with the side edges of the blade and a lever for operating said cutting jaws.

2. A cutting device comprising a head provided with a blade having indentations, cutting jaws co-acting with the side edges of said blade provided with indentations, a bar connecting the outer edges of said cutting jaws and a lever pivotally mounted on the head for operating said jaws.

3. A cutting device comprising a head provided with a cutting blade, cutting jaws co-acting with the side edges of said blade connected together by a bar, means for limiting the movement of said cutting jaws with respect to said blade and means for operating said jaws.

4. In a device of the kind described the combination with a head provided with an outwardly projecting cutting blade, cutting jaws co-acting with the side edges of said blade connected together by a bar at their ends, a pushing blade mounted upon said head between said jaws and a lever for operating said jaws.

5. In a device of the kind described the combination with a frame provided with a head having an outwardly projecting blade, of a U-shaped shank pivotally mounted on said frame having jaws formed on its ends co-acting with the blade of the head and a lever pivotally mounted on the head connected to the side bars of said shank by links.

6. In a device of the kind described the combination with a frame provided with a head having an outwardly projecting blade, of a U-shaped shank pivotally mounted on said frame provided with cutting jaws co-acting with said blade, a bar connecting the ends of said cutting jaws and a lever pivotally mounted on the head for operating said jaws.

7. In a device of the kind described the combination with a frame having an integral head at one end provided with an outwardly projecting blade, of a U-shaped shank pivotally mounted on said frame having cutting jaws formed at its ends, a cross-bar connecting said cutting jaws, means for limiting the upward movement of said jaws and means for removing the block of substance cut by said jaws and blade from the same.

8. In a device of the kind described the combination with a U-shaped frame having a head at one end provided with a blade, a U-shaped shank pivotally mounted on the end of said frame provided with a handle, jaws formed on the ends of said shank co-acting with the side edges of said blade, a bar connecting said jaws, means for limiting the upward movement of said jaws and a U-shaped lever pivotally mounted on said head carrying links connected to said shank for operating said jaws.

9. In a lard cutter the combination with a U-shaped frame having a head at one end provided with a blade extending outwardly and upwardly therefrom, of a U-shaped shank pivotally mounted on said frame, the side bars of said shank being provided with cutting jaws at their ends, a bar connecting said cutting jaws, an adjustable stop carried by the head and a pivoted catch carried by one of said jaws adapted to engage said stop for limiting the upward movement of said jaws.

10. In a lard cutter the combination with a substantially U-shaped frame having a head at one end provided with a blade extending outwardly therefrom, of a U-shaped shank pivotally mounted on the end of said frame provided with a handle, cutting jaws formed on the ends of the side bars of the shank co-acting with the side edges of the blade, a bar connecting said cutting jaws, an adjustable stop carried by the head, a pivoted catch carried by one of said jaws for engaging said stop and a lever pivotally mounted on the head provided with a handle and connected to said shank by links.

11. In a lard cutter the combination with a substantially U-shaped frame provided with a head having a blade extending outwardly and upwardly therefrom, of a U-shaped shank pivotally mounted on said frame having cutting jaws co-acting with the side edges of said blade, a bar connecting the ends of the cutting jaws, a pushing blade loosely mounted on the head, means for limiting the upward movement of said jaws and means for operating the jaws.

12. In a lard cutter the combination with a head provided with an outwardly projecting blade, pivoted jaws co-acting with the side edges of said blade connected together by a bar, a guide-way formed on said head, a screw carrying a nut mounted in said head and a pivoted catch carried by one of said jaws adapted to be guided into engagement with said nut by said guide-way.

13. In a lard cutter the combination with a head carried by a frame, a blade extending outwardly from the bottom of said head, jaws co-acting with the side edges of said blade, a bar connecting said jaws, a guide-way formed in said head a screw loosely mounted in said head carrying a nut, a pivoted catch adapted to be guided into engagement with said nut by said guide-way when said device is in a vertical position and a lever pivotally mounted on the head connected to said jaws by links.

14. In a lard cutter the combination with a substantially U-shaped frame having a head formed at one end provided with an outwardly projecting blade, a U-shaped shank pivotally mounted on said frame provided with a handle, jaws formed on the ends of the side bars of said shank connected together by a bar, a U-shaped lever pivotally mounted on said head provided with a handle, links connecting said lever to the side bars of said shank, a groove formed in an edge of the head, a guide-way arranged in said groove, a screw swiveled in a plate secured in the bottom of the head, a nut carried by said screw and a pivoted catch carried by one of said jaws adapted to be guided into engagement with said nut by said guide-way.

JOHN D. LEEN.

Witnesses:
GEO. B. GOODALE,
HARRY B. WYMAN.